UNITED STATES PATENT OFFICE.

HRAND G. ESSAYAN, OF BOSTON, MASSACHUSETTS.

ENAMEL.

1,091,492.     Specification of Letters Patent.     Patented Mar. 31, 1914.

No Drawing.     Application filed November 20, 1912. Serial No. 732,436.

*To all whom it may concern:*

Be it known that I, HRAND G. ESSAYAN, a subject of the Sultan of Turkey, and a resident of Boston, in the county of Suffolk and State of Massachusetts, have invented a new and useful Improvement in Enamel, of which the following is a specification.

My invention relates to enamel for metallic surfaces and my object is to provide an enamel which shall be elastic as distinguished from the brittle vitreous enamels in use to-day.

In preparing my improved enamel which is an improvement on the well known Niello enamel, I melt together in a suitable vessel silver, preferably pure, copper, lead, and sulfur, and after the mass has become molten, the heating is continued for a short time and the mixture continually stirred and all impurities that rise to the surface are skimmed off. The mixture is then allowed to cool, and after cooling is crushed. A certain portion is reduced to powder and the remainder, which is tough and soft, and which cannot be pulverized, is put back in the vessel and melted and stirred and skimmed as above set forth. After the resulting mass has cooled, it is again crushed and the soft tough portions separated from the pulverizable part and re-heated, and the process is thereafter carried on through a total of seven or eight heatings until substantially the entire mass is reduced to powder.

In the manufacture of my improved enamel, I prefer first to melt the copper, then add the silver, and then the lead, and finally, after the copper, silver and lead have been melted, to add the sulfur.

The finished product, which as above stated, is a powder, may be mixed with borax and water and the resulting paste applied to the metallic surface to be enameled. After heating the metal and paste, the latter is converted into a hard, elastic, black enamel, which is not vitreous or brittle, and which will stand a severe blow or considerable bending and re-bending without cracking. After the first layer of enamel has been applied to a metallic surface, a second or any desired number of layers may be added, by placing a layer of the paste over the layer of enamel and heating as above described. The final layer is of course buffed and is susceptible of a high degree of polish.

The proportions of the ingredients of my improved enamel may be greatly varied. I prefer to employ one part by weight of silver, four parts by weight of copper, four parts by weight of lead, and forty parts by weight of sulfur. I do not, however, wish to be limited to these proportions and so far as I am at present advised, good results can be obtained by using one part by weight of silver, from three to six parts by weight of copper, from three to six parts by weight of lead, and from twenty to eighty parts by weight of surfur.

What I claim as new and desire to secure by Letters Patent is—

1. As a new article of manufacture, an enamel comprising one part by weight of silver, four parts by weight of copper, four parts by weight of lead, and forty parts by weight of sulfur.

2. The process of making enamel, which consists in melting silver, copper and lead, adding sulfur to the molten mass, and then heating said molten mass for a short period, cooling the same, crushing the resulting product after cooling, removing the pulverized portion thereof, reheating and melting the remaining non-pulverizable portion, again crushing the mass after cooling and separating the pulverized part therefrom, and repeating such heating, crushing and separation until substantially the entire mass is reduced to powder.

In testimony whereof, I have hereunto subscribed my name this 18th day of Nov. 1912.

HRAND G. ESSAYAN.

Witnesses:
E. B. TOMLINSON,
GEO. K. WOODWORTH.

---

Copies of this patent may be obtained for five cents each, by addressing the "Commissioner of Patents, Washington, D. C."